Nov. 9, 1926.
J. A. SCOTT
1,606,320
HOSE COUPLING
Filed August 23, 1924
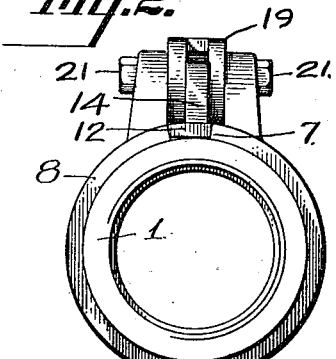
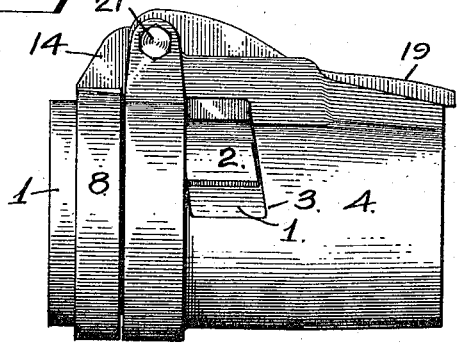
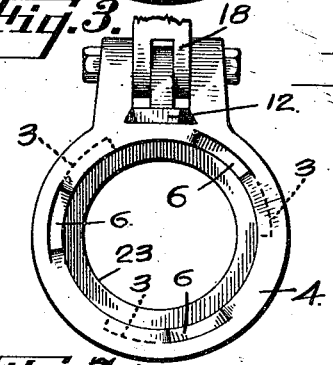
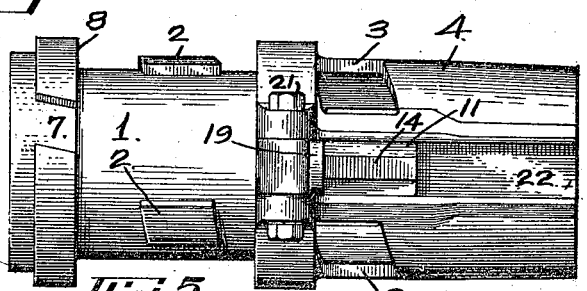
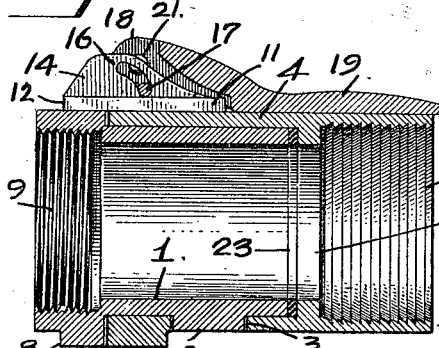
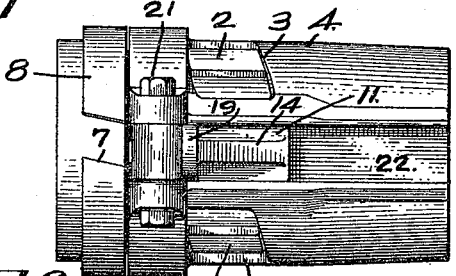
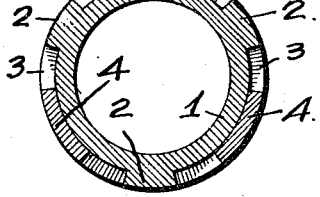
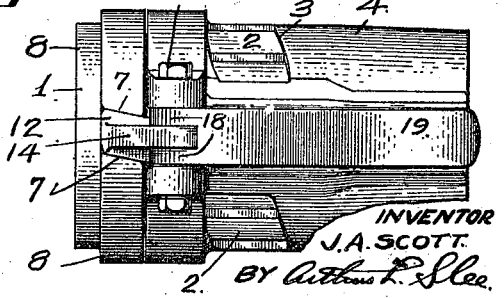
INVENTOR
J. A. SCOTT.
BY Arthur L. Lee.
ATTY.

Patented Nov. 9, 1926.

1,606,320

UNITED STATES PATENT OFFICE.

JAMES A. SCOTT, OF SAN FRANCISCO, CALIFORNIA.

HOSE COUPLING.

Application filed August 23, 1924. Serial No. 733,804.

My invention relates to improvements in hose couplings, of the type provided with bayonet slots and lugs to hold the two members of the coupling in rigid and close connection, wherein an inclined bar on one of the members of the coupling operates in conjunction with an inclined slot on the other member to partially rotate the same to insure rigid engaging relation of the slots and lugs and to simultaneously lock said lugs and slots in said engaging relation.

The primary object of the present invention is to provide a new and improved hose coupling.

Another object of the present invention is to provide a new and improved hose coupling adapted to effectively provide a tight connection for heavier types of hoses, such as fire-hose, heavy oil lines and other places where heavy high pressure hose is utilized.

A further object is to provide a new and improved hose coupling for heavy high-pressure hoses wherein a hose may be quickly, easily and efficiently connected to another section of hose, to a fire plug, or to any other connection.

A still further object is to provide a new and improved connection of the character described wherein the connection is automatically and positively locked to prevent accidental or inadvertent disconnection of the coupling or hose section members.

Another object is to provide a new and improved hose coupling of the type set forth that shall be adapted to facilitate the unlocking and separation of the members of the coupling.

I accomplish these and other objects by means of the improved device disclosed in the drawings forming a part of the present specification, wherein like characters of reference are used to designate similar parts throughout the said specification and drawings, and in which—

Fig. 1 is an elevation of the two coupling members in assembled relation;

Fig. 2 is an end elevation of Fig. 1;

Fig. 3 is an end elevation of the female member with the male member removed therefrom;

Fig. 4 is a top plan view of the two members aligned but unconnected;

Fig. 5 is a similar view showing the male member inserted within the female member with the lugs partially engaging the slots and the locking means inoperative;

Fig. 6 is a similar view disclosing the locking member in position;

Fig. 7 is a vertical longitudinal sectional view of Fig. 1; and

Fig. 8 is a transverse sectional view taken on line 8—8 of Fig. 1 in the direction indicated.

Referring to the drawings the numeral 1 is used to designate a male member having lugs 2 arranged to engage bayonet slots 3 within a female member 4 of a hose coupling, entrance to said slots 3 being had through suitable channels 6, shown in Fig. 3 of the drawings, which connect with said slots 3.

The male member 1 is also provided with an annular collar 8 provided in one portion of its periphery with an inclined groove 7, the purpose of which will hereinafter be more fully set forth.

The male member 1 is provided with an internal thread 9 by means of which the male member 1 may be screwed onto a fire plug, or other connection, not shown. By substituting internal annular serrations, such as shown at 10 on the female member, in Fig. 7 of the drawings, said male member 1 may be attached to another section of hose, not shown, when it is desired to connect two sections of hose together with this type of hose coupling.

A bar 11 is slidably mounted upon the periphery of the female member 4 and is provided with an inclined portion 12, shown in Fig. 7 of the drawings. The bar 11 is also provided with a lateral extension 14 provided with a suitably shaped slot 16 which is slidably engaged by a pin 17 extending between the bifurcations 18 of a lever 19 pivotally connected to the female member 4 by means of suitable bolts 21, so that the lever may be swung from a virtually perpendicular to a longitudinal position relative to the female member, or vice versa.

A groove 22 is formed within the periphery of the female member 4 to receive the lever 19 when swung to the longitudinal position.

In operation the male and female members 1 and 4 respectively are moved into alignment with the lugs 2 of the male member 1 opposite the channels 6 which connect with the inclined bayonet slots 3 of the female member 4; the male member 1 is then moved into the female member 4, the lugs 2 simultaneously moving into their respective slots 3. As the lugs 2 are provided with inclined ends as shown in the drawings, it is obvious that a light rotation of the male member 1 within the female member 4 will cause the inclined lugs 2 to engage the inclined edges of the bayonet slots 3 and thereby move the end of the male member 1 onto the gasket 23 seated upon the internal annular collar 24 within the female member 4 as disclosed in Fig. 7 of the drawings.

In high pressure lines, such as fire hose or oil lines, or in fact in any high pressure hose, it is essential that a tight and very rigid connection be maintained between the inner end of the male member 1 and the gasket in order to prevent leakage.

In order to accomplish and effect this rigid and tight connection my novel arrangement is now brought into use which is accomplished as follows:

The inclined groove 7, of which there may be several, one for each possible position of the male member 1 with respect to the female member 4 when the lugs 2 of the former are engaging the bayonet slots 3 of the latter, is arranged at such a position that when the lever 19 is moved perpendicularly to the female member 4 the inclined portion 12 of the slidable bar 11 wil be approximately opposite the adjacent entrance to the inclined groove 7 within the annular collar 8 of the male member 1.

The lever 19, while in such perpendicular position, will serve as an effective lever to move the lugs 2 into a more rigid engagement with the bayonet slots 3, or to partially rotate the female member 4 upon the male member 1 until the inclined portion 12 of said bar 11 is directly opposite the entrance to the inclined groove 7 of the male member 1. When said handle or lever 19 is moved toward the groove 22, provided for its reception in the periphery of the female member 4, the pin 17 operating within the arcuate slot 16 of the lateral extension 14 of the bar 11 will move said bar outwardly from the female member 4 and into the inclined groove 7 of the male member 1. As said bar is thus moved one of the inclined sides or edges thereof will readily engage one of the inclined edges or sides of the inclined groove 7 and thereby partially rotate the male member 1 in a direction which will tend to quickly, efficiently and effectively move the inclined ends of the lugs 2 along the inclined edges of the bayonet slots 3 and thereby more tightly seat the inner end of the male member 1 against the gasket 23 seated upon the annular collar 24 within the female member 4 and thereby prevent leakage.

It is obvious that as the inclined portion 12 of the bar 11 is moved into the inclined groove 7 the rigid engagement of the lugs 2 with the bayonet slots 3 is positively locked and that said locking features is effected simultaneously with the movement for rigidly engaging the lugs 2 with the slots 3.

When the lever 19 is moved into its recess or groove 22 the bar 11 and its inclined portion 12 are firmly locked in position which will provide a positive lock against a reverse movement of the parts or members 1 or 4 so that it will be impossible to disconnect the coupling accidentally or inadvertently unless the lever 19 is first moved to a perpendicular position with respect to the female member 4 upon which it is pivotally mounted.

It is also obvious that it may be rather difficult to separate the male and female members of the coupling after such a rigid engagement has been effected between the lugs 2 and slots 3. In order to facilitate this separation the inclined portion 12 of the bar 11 and has been provided, which inclined portion 12 provides inclined edges or surfaces on both sides of said bar or portion 12. By moving the handle or lever 19 to its perpendicular position, the bar 11 is withdrawn from the inclined groove 7 and during this movement the opposite side of the inclined portion 12 will engage the opposite side of the inclined groove 7 and thereby move the male member 1 in a direction which will disengage the inclined ends or edges of the lugs 2 from the inclined ends or edges of the bayonet slots 3. Having started such separation and thereby relieved a greater portion of the pressure between the inner end of the male member 1 and the gasket 23, the perpendicular position of the lever 19 may be utilized to further rotate the female member 4 upon the male member 1, when the latter is held tightly against rotation by extraneous means, not shown, and thus further facilitate the separation of the male from the female member.

It is obvious from the foregoing that I have provided a new and improved hose coupling having improved means for providing a tight and rigid connection between section of hoses or between a hose and standpipe, fireplug, or any other desired connection, with a minimum of labor and within a comparatively short space of time, that is, within less time, and with less effort than the well known screw-threaded coupling members now commonly in use.

Having thus described my invention what I claim as new and desire to secure by Letters Patent is—

1. The combination, with a hose coupling, of a male member provided with lugs and having a groove in the periphery thereof; a female member provided with bayonet slots to receive the lugs of the male member; a bar slidably mounted upon the female member and having an inclined surface to engage one side of said groove; and means for moving the bar to engage the groove in the male member to partially rotate the same and move the lugs into rigid engaging relation with the slots and to lock said lugs in said engaging relation, said means comprising a lever pivotally mounted upon the female member so that the lever may be swung from a virtually perpendicular to a longitudinal position relative to the female member, or vice versa, for holding the bar in locked engagement in said groove or for holding the bar disengaged from the groove.

2. The combination, with a hose coupling, of a male member provided with lugs and having an inclined groove in the periphery thereof; a female member provided with bayonet slots to receive and engage the lugs of the male member whereby said male and female members may be held in rigid connection; a bar slidably mounted upon the female member and having an inclined portion to engage the inclined groove; and means for moving the bar to engage the inclined portion thereof with one side of the inclined groove on the male member to partially rotate said member and move the lugs thereon into rigid engaging relation with the bayonet slots of the female member and thereby positively lock said lugs and bayonet slots in said engaging relation, said means comprising a lever pivotally mounted upon the female member so that the lever may be swung from a virtually perpendicular to a longitudinal position relative to the female member, or vice versa, for holding the bar in locked engagement in said groove or for holding the bar disengaged from the groove.

3. The combination, with a hose coupling, of a male member provided with lugs and having an inclined groove arranged in the periphery thereof; a female member provided with bayonet slots arranged to receive and engage the lugs; a bar slidably mounted upon the female member and having an inclined portion arranged to engage the inclined groove on the male member; and means for moving the bar to cause the inclined portion thereof to engage the inclined groove of the male member and partially rotate said male member to move the lugs thereon into rigid engaging relation with the bayonet slots of the female member and to lock said lugs in said engaging relation, when said moving means is moved in one direction, and to unlock and partially disengage said lugs from said slots when said moving means is moved in an opposite direction.

4. The combination, with a hose coupling, of a male member provided with lugs and having an inclined groove arranged in the periphery thereof; a female member provided with bayonet slots to receive and engage the lugs of the male member to hold said member in rigid connection with said female member; a bar slidably mounted within the female member and having an inclined portion to engage the inclined groove in the male member, said bar being also provided with a lateral projection having an arcuate slot therein; and a handle pivotally mounted upon the female member adjacent the bar and provided with a pin to engage the arcuate slot to move said bar to cause the inclined portion thereof to engage the inclined groove and partially rotate the male member and thereby move the lugs thereon into rigid engaging relation with the bayonet slots and thereby lock said lugs in such engaging relation, said handle being also arranged to move the slidable bar to unlock and partially disengage said lugs with said slots and to serve as a lever to rotate said female member and complete the disengagement of said lugs with said slots.

In witness whereof I hereunto set my signature.

JAMES A. SCOTT.